United States Patent
Dou et al.

(10) Patent No.: US 11,073,067 B2
(45) Date of Patent: Jul. 27, 2021

(54) EXHAUST GAS TREATMENT SYSTEM AND METHOD WITH REDUCTANT INJECTION AND CLOSE-COUPLED TREATMENT ELEMENT

(71) Applicant: Deere & Company, Moline, IL (US)

(72) Inventors: Danan Dou, Cedar Falls, IA (US); Eric J. Hruby, Waterloo, IA (US); Shyan-Cherng Huang, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 191 days.

(21) Appl. No.: 16/244,799

(22) Filed: Jan. 10, 2019

(65) Prior Publication Data

US 2020/0224576 A1 Jul. 16, 2020

(51) Int. Cl.
*F01N 13/00* (2010.01)
*F01N 3/20* (2006.01)
(Continued)

(52) U.S. Cl.
CPC .......... *F01N 13/009* (2014.06); *F01N 3/035* (2013.01); *F01N 3/0814* (2013.01);
(Continued)

(58) Field of Classification Search
CPC combination set(s) only.
See application file for complete search history.

(56) References Cited

U.S. PATENT DOCUMENTS 9,616,385 B1 * 4/2017 Huang .................. F01N 13/009
9,649,596 B2 5/2017 Chang et al.
(Continued)

FOREIGN PATENT DOCUMENTS

DE 10335785 A1 3/2005
DE 102012220016 A1 5/2013
(Continued)

OTHER PUBLICATIONS

German Search Report issued in counterpart application No. 102019217894.4 dated Aug. 18, 2020 (11 pages).

*Primary Examiner* — Binh Q Tran
(74) *Attorney, Agent, or Firm* — Michael Best & Friedrich LLP (57) ABSTRACT

An exhaust gas treatment system for an internal combustion engine includes an exhaust gas pathway configured to receive exhaust gas from the internal combustion engine and a first treatment element positioned within the exhaust gas pathway such that the first treatment element is close coupled to the engine. The first treatment element includes a $NO_x$ storage element. A first injector is configured to selectively introduce a first reductant into the exhaust gas pathway upstream of the first treatment element, and a second injector is configured to introduce a second reductant into the exhaust gas pathway downstream of the first treatment element. The system includes a second treatment element positioned within the exhaust gas pathway downstream of the second injector, and the second treatment element includes a selective catalytic reduction (SCR) element.

19 Claims, 7 Drawing Sheets

(51) Int. Cl.
　　　*F01N 3/08*　　　　(2006.01)
　　　*F01N 3/035*　　　(2006.01)

(52) U.S. Cl.
　　　CPC ......... *F01N 3/0821* (2013.01); *F01N 3/0842* (2013.01); *F01N 3/2066* (2013.01); *F01N 2590/08* (2013.01); *F01N 2610/02* (2013.01)

(56) References Cited

U.S. PATENT DOCUMENTS

| | | | |
|---|---|---|---|
| 9,790,830 B2* | 10/2017 | Sun | F01N 3/2066 |
| 10,001,047 B2* | 6/2018 | Norris | F01N 3/2066 |
| 2011/0047994 A1 | 3/2011 | Kato | |
| 2014/0311128 A1* | 10/2014 | Dingle | F01N 3/106 60/274 |
| 2016/0136626 A1 | 5/2016 | Phillips et al. | |
| 2017/0051654 A1* | 2/2017 | Gupta | F01N 3/103 |
| 2017/0089242 A1* | 3/2017 | Ueda | F01N 3/0253 |
| 2017/0198619 A1* | 7/2017 | Huang | B01D 53/9409 |
| 2017/0204762 A1* | 7/2017 | Kotrba | F01N 9/00 |
| 2018/0080359 A1 | 3/2018 | Price et al. | |
| 2018/0142590 A1* | 5/2018 | Gupta | F01N 3/103 |
| 2018/0163596 A1 | 6/2018 | Punke et al. | |
| 2018/0185788 A1 | 7/2018 | Grubert et al. | |

FOREIGN PATENT DOCUMENTS

| | | |
|---|---|---|
| DE | 102015016986 A1 | 6/2017 |
| DE | 102016123850 A1 | 6/2017 |
| DE | 102018127387 A1 | 5/2019 |
| DE | 102018101929 A1 | 8/2019 |
| WO | WO0112320 A1 | 2/2001 |
| WO | WO2009099528 A2 | 8/2009 |

\* cited by examiner

EXHAUST GAS TREATMENT SYSTEM AND METHOD WITH REDUCTANT INJECTION AND CLOSE-COUPLED TREATMENT ELEMENT

BACKGROUND

The present disclosure relates to exhaust systems and more particularly to diesel exhaust gas treatment systems.

Diesel exhaust is typically subject to emissions regulations covering a variety of emission components, including particulate matter and nitrogen oxides ($NO_x$). A variety of exhaust treatment devices have been developed to reduce these emission components. For example, a selective catalytic reduction (SCR) element can be used to convert the $NO_x$ present in exhaust gas into other compounds, such as nitrogen, water, and carbon dioxide.

Typically, diesel exhaust fluid (DEF)—a solution of urea and deionized water—is injected upstream of the SCR element to provide ammonia, which acts as a reducing agent and reacts with the $NO_x$ in the presence of the SCR catalyst in accordance with Equation (1):

$$NO+NO_2+2NH_3 \rightarrow 2N_2+3H_2O \quad (1)$$

The $NO_x$ and ammonia are thus converted into nitrogen and water. As evident from Equation (1), the optimal stoichiometric ratio for this reaction includes equal parts of nitric oxide (NO) and nitrogen dioxide ($NO_2$).

Particulate matter is another component of diesel exhaust emissions being targeted with increasingly stringent regulations. A diesel particulate filter (DPF) or combined selective catalytic reduction and diesel particulate filter (SCR+F) can be used to trap diesel particulate matter. During operation, trapped soot on the filter element(s) can be oxidized through a process commonly referred to as passive regeneration. In particular, during passive regeneration, the carbon-based soot reacts with $NO_2$ in accordance with Equation (2) and Equation (3):

$$C+2NO_2 \rightarrow CO_2+2NO \quad (2)$$

$$C+NO_2 \rightarrow CO+NO \quad (3)$$

As evident from Equations (2) and (3), $NO_2$ also plays an important role in soot oxidation.

To provide enough $NO_2$ for $NO_x$ reduction and soot oxidation, some emissions systems include a diesel oxidation catalyst (DOC) upstream of a SCR and a DPF or a SCR+F element. The DOC includes one or more precious metals (e.g., platinum, palladium, etc.) that act as a catalyst to reduce emission of carbon monoxide, hydrocarbons, and volatile organic compounds. The DOC also oxidizes NO to $NO_2$, which promotes faster SCR reactions at exhaust temperatures above about 250 degrees Celsius.

At low temperatures (e.g., about 200 degrees Celsius or less) that occur during a cold start state of the engine or during very cold ambient operating conditions, the DOC will consume $NO_2$ by reacting $NO_2$ with carbon monoxide and hydrocarbons in the exhaust gas. This reduces the efficacy of downstream SCR or SCR+F elements, which require the presence of $NO_2$. The DOC also adds thermal mass to the exhaust gas treatment system, which delays warm-up of the downstream SCR or SCR+F elements.

SUMMARY

Low temperature $NO_x$ reduction is an increasingly important consideration as emissions regulations become more stringent. Accordingly, a need exists for an exhaust gas treatment system able to more effectively reduce $NO_x$ and other emission components from exhaust gas at low temperatures.

The present disclosure provides, in one aspect, an exhaust gas treatment system for an internal combustion engine. The system includes an exhaust gas pathway configured to receive exhaust gas from the internal combustion engine and a first treatment element positioned within the exhaust gas pathway such that the first treatment element is close coupled to the engine. The first treatment element includes a $NO_x$ storage element. A first injector is configured to selectively introduce a first reductant into the exhaust gas pathway upstream of the first treatment element, and a second injector is configured to introduce a second reductant into the exhaust gas pathway downstream of the first treatment element. The system includes a second treatment element positioned within the exhaust gas pathway downstream of the second injector, and the second treatment element includes a selective catalytic reduction (SCR) element.

In some embodiments, the $NO_x$ storage element includes a passive $NO_x$ adsorber.

In some embodiments, the $NO_x$ storage element includes a $NO_x$ storage catalyst.

In some embodiments, the first injector is configured to introduce the first reductant into the exhaust gas in response to a sensed temperature of the exhaust gas being within a predetermined temperature range.

In some embodiments, the predetermined temperature range is about 100 degrees Celsius to about 300 degrees Celsius.

In some embodiments, the first reductant includes ammonia gas, and the second reductant includes diesel exhaust fluid.

In some embodiments, the first treatment element includes a diesel particulate filter (DPF), and the $NO_x$ storage element is coated on the DPF.

In some embodiments, the second injector is configured to introduce the second reductant into the exhaust gas in response to a temperature of the exhaust gas exceeding a predetermined temperature.

In some embodiments, the first treatment element includes a selective catalytic reduction (SCR) element.

The present disclosure provides, in another aspect, an exhaust gas treatment system for an internal combustion engine. The system includes an exhaust gas pathway configured to receive exhaust gas from the internal combustion engine and a first treatment element positioned within the exhaust gas pathway such that the first treatment element is close coupled to the engine. The first treatment element includes a diesel particulate filter (DPF) coated with a precious metal catalyst. A first injector is configured to selectively introduce a first reductant into the exhaust gas pathway upstream of the first treatment element, and a second injector is configured to introduce a second reductant into the exhaust gas pathway downstream of the first treatment element. The system includes a second treatment element positioned within the exhaust gas pathway downstream of the second injector, and the second treatment element includes a selective catalytic reduction (SCR) element.

In some embodiments, the first reductant includes ammonia gas, and the second reductant includes diesel exhaust fluid.

In some embodiments, the first treatment element includes a selective catalytic reduction (SCR) element.

In some embodiments, the first treatment element includes a $NO_x$ storage element.

In some embodiments, the first treatment element includes an ammonia oxidation catalyst (AOC).

The present disclosure provides, in another aspect, an exhaust gas treatment system for an internal combustion engine. The system includes an exhaust gas pathway configured to receive exhaust gas from the internal combustion engine and a first treatment element positioned within the exhaust gas pathway such that the first treatment element is close coupled to the engine. The first treatment element includes a selective catalytic reduction (SCR) element and a $NO_x$ storage element. A first injector is configured to selectively introduce a first reductant into the exhaust gas pathway upstream of the first treatment element, and a second injector is configured to introduce a second reductant into the exhaust gas pathway downstream of the first treatment element. The system also includes a second treatment element positioned within the exhaust gas pathway downstream of the second injector.

In some embodiments, the $NO_x$ storage element is configured to selectively adsorb $NO_x$.

In some embodiments, the first injector is configured to introduce the first reductant into the exhaust gas in response to a sensed temperature of the exhaust gas being within a predetermined temperature range.

In some embodiments, the first treatment element includes a diesel particulate filter (DPF), and the SCR element and the $NO_x$ storage element are coated on the DPF.

In some embodiments, the second treatment element includes a selective catalytic reduction (SCR) element and an ammonia oxidation catalyst (AOC).

In some embodiments, the first reductant includes ammonia gas, and the second reductant includes diesel exhaust fluid.

Other features and aspects of the disclosure will become apparent by consideration of the following detailed description and accompanying drawings.

Before any embodiments are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
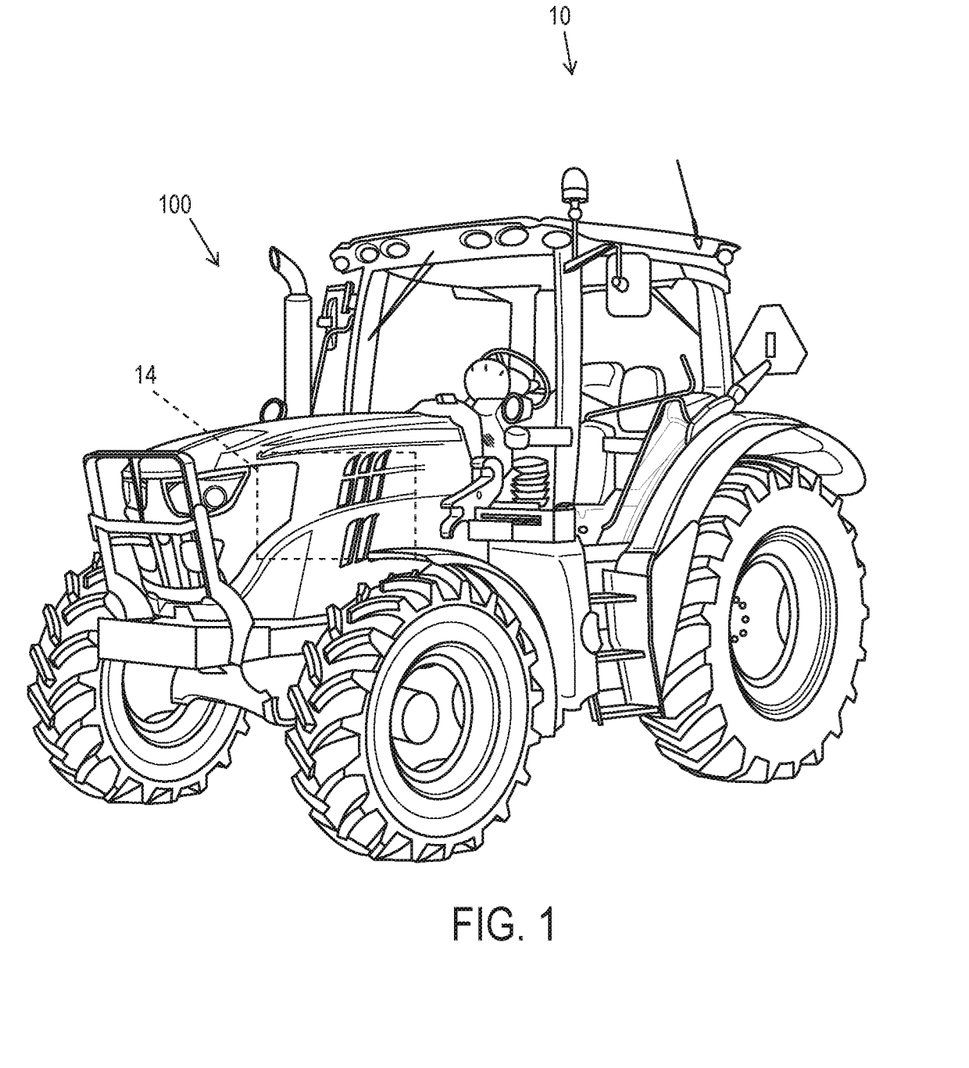
FIG. 1 is a perspective view of a vehicle in which the disclosed exhaust gas treatment system and method may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
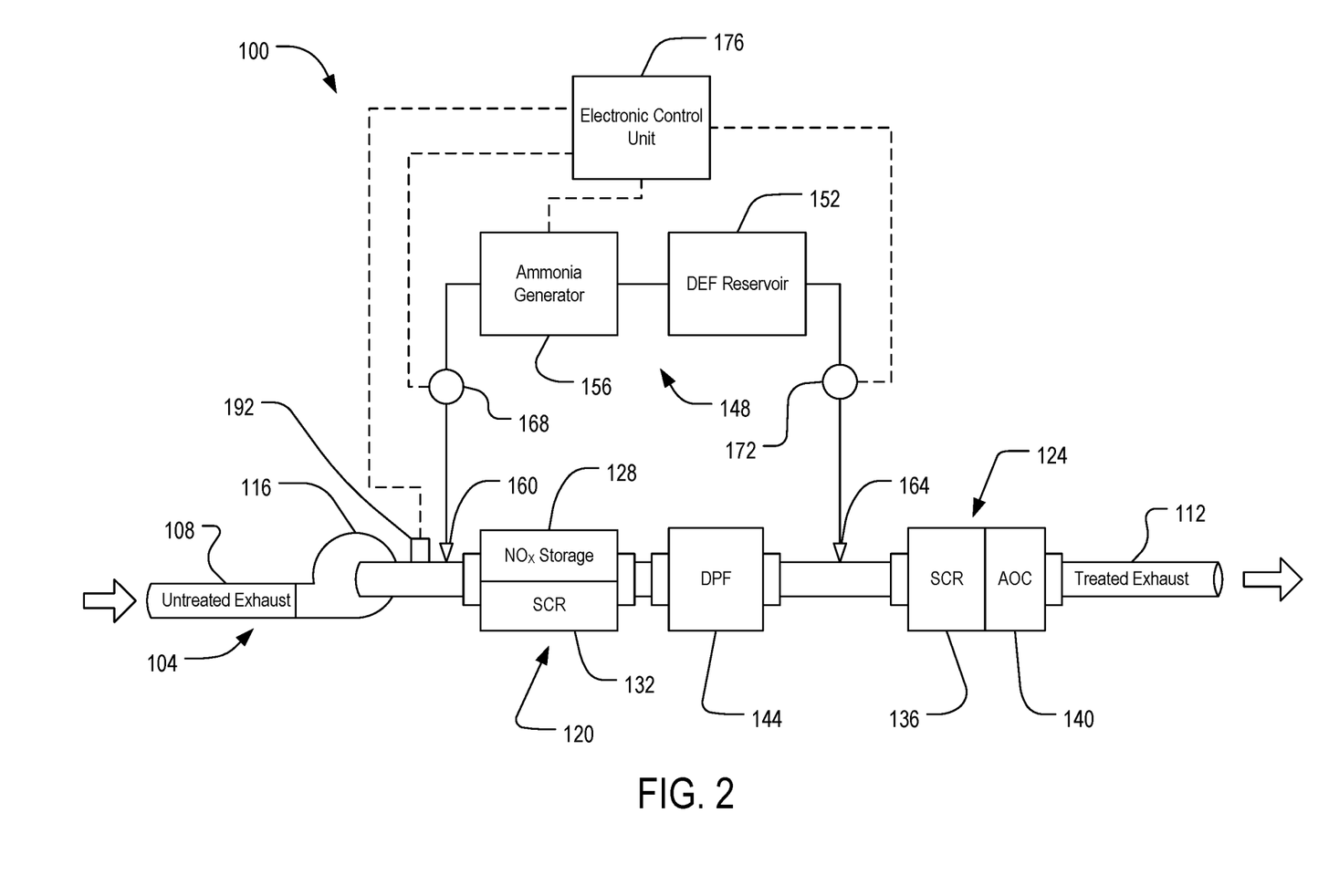
FIG. 2 is a schematic diagram of an exhaust gas treatment system according to one embodiment.

With reference to FIG. 2, the exhaust gas treatment system 100 includes an exhaust pathway 104 (e.g., an exhaust pipe) having an inlet or upstream side 108 and an outlet or downstream side 112. A turbocharger 116 is disposed in the exhaust pathway 104 proximate the inlet 108, but in alternative embodiments, the turbocharger 116 may be omitted.

A first treatment element 120 and a second treatment element 124 are located in series along the exhaust pathway 104, between the inlet 108 and the outlet 112. Although the second treatment element 124 is located downstream of the first treatment element 120 in the illustrated embodiment, the numeric designations "first," "second," etc. are used herein for convenience and should not be regarded as defining order, quantity, or relative position. In addition, the illustrated first and second treatment elements 120, 124 are located downstream of the turbocharger 116. In other embodiments, however, the turbocharger 116 may be located between the first and second treatment elements 120, 124 or downstream of the treatment elements 120, 124.

In the illustrated embodiment, the first treatment element 120 is close coupled to the engine 14 and includes a monolithic, flow-through substrate matrix having between about 200 and about 600 cells per square inch in some embodiments. The substrate matrix can be made of ceramic, metal, or any other heat-resistant, structural material. A $NO_x$ storage element 128 and an SCR element 132 are coated on to the substrate matrix (e.g., via a washcoating process).

The $NO_x$ storage element 128 captures and stores $NO_x$ at temperatures within a first temperature range (e.g., between about 100 degrees Celsius and about 300 degrees Celsius in some embodiments, or between about 100 degrees Celsius and about 250 degrees Celsius in other embodiments). That is, the $NO_x$ storage element 128 captures and stores $NO_x$ at relatively low temperatures experienced during cold start or cold ambient operating conditions. The $NO_x$ storage element 128 releases the stored $NO_x$ at temperatures above the first temperature range, once the exhaust gas treatment system 100 has heated up.

In some embodiments, the $NO_x$ storage element 128 includes a passive $NO_x$ adsorber (PNA). In such embodiments, the $NO_x$ storage element 128 includes a zeolite, and preferably a small pore zeolite such as Chabazite or Linde Type A (LTA) that is thermally stable at temperatures up to at least 700 degrees Celsius. Palladium, platinum, or, in some embodiments, a mixture of precious metals, is dispersed on the zeolite. The precious metal can be dispersed on the zeolite by ion-exchange, adsorption, impregnation, or any other suitable method, such that precious metal ions are dispersed into the pores of the zeolite. The zeolite acts a molecular sieve such that only small molecules such as $NH_3$, NO, and $NO_2$ able to enter freely into the molecular structure of the zeolite. The precious metal ions dispersed in the zeolite store $NO_x$ and $NH_3$ by adsorption.

In other embodiments, the $NO_x$ storage element 128 includes a $NO_x$ storage catalyst. In such embodiments, the $NO_x$ storage element 128 includes a precious metal catalyst (e.g., platinum or palladium) coated on a base metal oxide, such as barium-aluminum oxide. The precious metal catalyst is configured to oxidize nitric oxide (NO) to nitrogen dioxide ($NO_2$), which then forms nitrates with the base metal oxide to effectively capture and store $NO_x$.

The SCR element 132 is coated over the $NO_x$ storage element 128, or vice versa. The SCR element 132 includes one or more base metal oxides, for example, such as $Al_2O_3$, $SiO_2$, $TiO_2$, $CeO_2$, $ZrO_2$, $V_2O_5$, $La_2O_3$. Alternatively or additionally, the SCR element 132 may include one or more zeolites.

With continued reference to FIG. 2, the second treatment element 124 in the illustrated embodiment includes a selective catalytic reduction (SCR) portion 136 and an ammonia oxidation catalyst (AOC) portion 140. The SCR portion 136 may include, for example, a catalytic washcoat on a monolithic support material, such as ceramic. In other embodiments, the SCR portion 136 may be replaced by a combined selective catalytic reduction and diesel particulate filter (SCR+F) portion, with a catalytic washcoat coated on a porous filter substrate.

The SCR portion 136 and the AOC portion 140 are positioned in series, with the AOC portion 140 located downstream of the SCR portion 136. The SCR portion 136 and the AOC portion 140 may be packaged together in a common housing. The SCR portion 136 reduces $NO_x$ from exhaust gas passing through the SCR portion 136. The AOC portion 140 converts excess ammonia leaving the SCR portion 136 to nitrogen and water. In some embodiments, the AOC portion 140 may be omitted. Alternatively, the AOC portion 140 may be provided as a separate treatment element positioned downstream of the second treatment element 124.

The illustrated system 100 further includes a diesel particulate filter (DPF) 144 able to capture particulate matter and oxidize soot from the exhaust gas. The DPF 144 is located between the first treatment element 120 and the second treatment element 124. That is, DPF 144 is located downstream of the first treatment element 120 and upstream of the second treatment element 124. In other embodiments, the DPF 144 may be integrated into the first treatment element 120, the second treatment element 124, or both.

The DPF 144 can be replaced by a combined selective catalytic reduction and diesel particulate filter (SCR+F) element including a catalytic washcoat on a porous filter substrate. The washcoat may include one or more base metal oxides, for example, such as $Al_2O_3$, $SiO_2$, $TiO_2$, $CeO_2$, $ZrO_2$, $V_2O_5$, $La_2O_3$. Alternatively or additionally, the washcoat may include one or more zeolites. In such embodiments, the first treatment element SCR+F can capture particulate matter, oxidize soot, and reduce $NO_x$ from exhaust gas. In yet other embodiments, other types of catalyzed DPF 144 may be used.

With continued reference to FIG. 2, the exhaust gas treatment system 100 also includes a reductant supply 148 for supplying reductant into the exhaust gas pathway 104. In the illustrated embodiment, the reductant supply 148 includes a diesel exhaust fluid (DEF) reservoir 152 and an ammonia generator 156. The DEF reservoir 152 is in fluid communication with the ammonia generator 156 to supply DEF to the ammonia generator 156, which converts the DEF to ammonia gas (e.g., via thermolysis and hydrolysis).

A pump (not shown) is be provided to move DEF from the DEF reservoir 152 to the ammonia generator 156. The pump is variably controlled to vary the amount of DEF supplied to the ammonia generator 156, and thus vary the amount of ammonia output by the ammonia generator 156. In other embodiments, the DEF may move from the DEF reservoir 152 to the ammonia generator 156 under the influence of gravity. In such embodiments, one or more valves (not shown) may be provided between the DEF reservoir 152 and the ammonia generator 156 to vary the flow of DEF to the ammonia generator 156. In some embodiments, the ammonia generator 156 may be replaced with an ammonia reservoir, such as a pressurized ammonia storage tank.

A first injector 160 and a second injector 164 are in fluid communication with the reductant supply 148. In the illustrated embodiment, the first injector 160 is coupled to the ammonia generator 156 to receive a first reductant (i.e. ammonia gas) from the ammonia generator 156, and the second injector 164 is coupled to the DEF reservoir 152 to receive a second reductant (i.e. DEF) from the DEF reservoir 152.

The first injector 160 and the second injector 164 may be directly fluidly coupled to the ammonia generator 156 and the DEF reservoir 152, respectively (e.g., by independent conduits), or the first injector 160 and the second injector 164 may be fluidly coupled to a branch line, manifold, or other fluid transfer structure. In alternate embodiments, the reductant supply 148 may provide only a single reductant (DEF, ammonia, or any other suitable reductant) to both the first injector 160 and the second injector 164.

The first injector 160 is positioned to introduce the first reductant into the exhaust pathway 104 at a first location upstream of the first treatment element 120 (i.e. between the turbocharger 116 and the first treatment element 120). The second injector 164 is positioned to introduce the second reductant into the exhaust pathway 104 at a second location downstream of the first treatment element 120 and upstream of the second treatment element 124 (i.e. between the first and second treatment elements 120, 124). In the illustrated embodiment, the second location is also downstream of the DPF 144. The exhaust gas treatment system 100 may include one or more flow affecting features (not shown) to promote mixing of the reductant in the exhaust gas upstream of either or both the first treatment element 120 and the second treatment element 124.

A first valve 168 is disposed between the ammonia generator 156 and the first injector 160, and a second valve 172 is disposed between the DEF reservoir 152 and the second injector 164. In some embodiments, the first and second valves 168, 172 can be incorporated into the respective injectors 160, 164 or into the ammonia generator 156 and DEF reservoir 152. Alternatively, each of the valves 168, 172 may be replaced by a pump.

Each of the illustrated valves 168, 172 is movable between a closed position in which the flow of reductant through the valve 168, 172 is substantially inhibited, and an open position in which reductant can flow freely through the valve 168, 172 (e.g., via solenoid actuators, pneumatic actuators, hydraulic actuators, or the like). In some embodiments, one or both of the valves 168, 172 can also have at least one intermediate position, between the closed and open positions, in which the flow of reductant through the valve 168, 172 is partially restricted. In some embodiments, one or both of the valves 168, 172 can be modulated to vary the flow rate of reductant.

Figure 3:
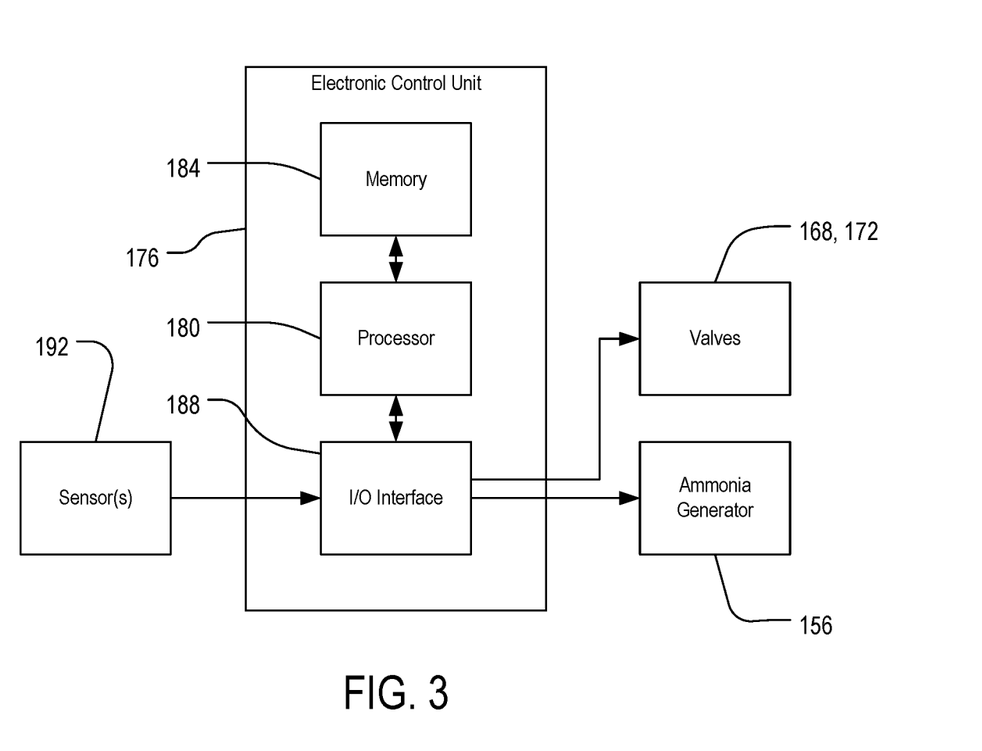
FIG. 3 is a block diagram of an electronic control unit of the exhaust gas treatment system of FIG. 2.

The exhaust gas treatment system 100 further includes an electronic control unit or ECU 176 that controls operation of the system 100. Referring to FIG. 3, the ECU 176 includes a plurality of electrical and electronic components that provide power, operational control, and protection to the components and modules within the ECU 176. In particular, the ECU 176 includes, among other things, an electronic processor 180 (e.g., a programmable microprocessor, microcontroller, or similar device), non-transitory, machine-readable memory 184, and an input/output interface 188. The electronic processor 180 is communicatively coupled to the memory 184 and configured to retrieve from memory 184 and execute, among other things, instructions related to the control processes and methods described herein. In other embodiments, the ECU 176 includes additional, fewer, or different components.

In the illustrated embodiment, the ECU 176 is communicatively coupled to the first valve 168, the second valve 172, and the ammonia generator 156 (i.e. via the input/output interface 188). The ECU 176 may also be configured to communicate with external systems including, for example, engine controls and/or operator controls.

The illustrated ECU 176 is communicatively coupled to a temperature sensor 192, which in the illustrated embodiment is coupled to the exhaust pathway 104 at a location upstream of the first treatment element 120 (FIG. 2). The temperature sensor 192 may be a thermistor, thermocouple, resistance temperature detector, infrared sensor, or any other sensor suitable for measuring the temperature of exhaust gas. All or a portion of the temperature sensor 192 may extend into the exhaust pathway 104 so as to be directly exposed to exhaust gas. Alternatively, the temperature sensor 192 may be located outside the exhaust pathway 104 and measure the temperature of the exhaust gas indirectly (e.g., by measuring the temperature of the exhaust pipe).

The sensor 192 provides a temperature signal (e.g., an electrical signal) to the ECU 176 associated with the temperature of the exhaust gas flowing through the exhaust gas pathway 104 at the position of the temperature sensor 192. In the illustrated embodiment, the temperature signal is associated with the temperature of the exhaust gas entering the first treatment element 120.

Figure 4:
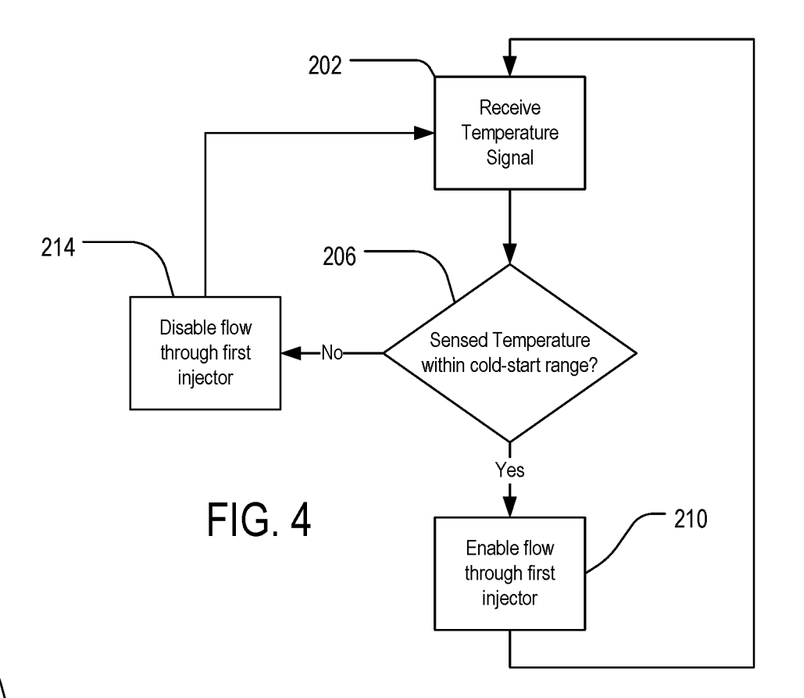
FIG. 4 is a flow diagram illustrating operation of the exhaust gas treatment system of FIG. 1.

In operation, the ECU 176 periodically or continuously receives the temperature signal from the sensor 192 at block 202 of FIG. 4 (e.g., via the input/output interface 188), which is indicative of the temperature of the exhaust gas exiting the first treatment element 120. The ECU 176 uses the temperature signal to determine a sensed temperature of the exhaust gas. At block 206, the ECU 176 then periodically or continuously compares the sensed temperature with a temperature range. In some embodiments, the temperature range is about 100 degrees Celsius to about 300 degrees Celsius in some embodiments, or between about 100 degrees Celsius to about 250 degrees Celsius in other embodiments. The temperature range corresponds with a cold-start or cold-operating temperature range of the exhaust gas treatment system 100. The temperature range may be predetermined and stored in memory 184 (FIG. 3) or may be calculated and periodically or continuously modified by the ECU 176 in response to feedback from one or more additional sensors.

If the sensed temperature is within the temperature range, at block 210 (FIG. 4) the ECU 176 sets the first injector 160 to dose the first reductant (i.e. ammonia) into the exhaust gas pathway 104 by opening the first valve 168 (FIG. 2). In the illustrated embodiment, the ECU 176 also monitors an amount of ammonia available from the ammonia generator 156 and activates the ammonia generator 156 to produce additional ammonia, if necessary.

The ammonia mixes with the exhaust gas and enters the first treatment element 120. At the relatively low temperatures experienced within the cold-start temperature range, the $NO_x$ storage element 128 extracts and stores $NO_x$ from the passing exhaust gas. Because molecules of ammonia are similar in size to $NO_x$ molecules, the ammonia can enter the pores of the $NO_x$ storage element 128 and react with stored $NO_x$ to form nitrogen and water. This regenerates the $NO_x$ storage element 128 and frees up molecular sites for additional $NO_x$ storage. The reaction is enhanced by the SCR element 132, which is coated together with the $NO_x$ storage element 128 over the flow-through substrate of the first treatment element 120.

After exiting the first treatment element 120, the partially treated exhaust flows through the DPF 144, which captures soot and particulate matter from the exhaust gas. Next, the exhaust gas flows through the SCR portion 136 and the AOC portion 140 of the second treatment element 124. The AOC portion 140 oxidizes any unreacted ammonia remaining in the exhaust gas. Because the second treatment element 124 is downstream of the first treatment element 120 and the DPF 144, it warms up more slowly than the close-coupled first treatment element 120. The first treatment element 120 is advantageously able to effectively reduce $NO_x$ during the cold-start temperature range, however, giving the second treatment element 124 time to warm up and increase its efficacy.

The ECU 176 continues to monitor the temperature sensor 192 at block 202 (FIG. 4). When the exhaust gas treatment system 100 has warmed up sufficiently such that the sensed temperature exceeds the cold-start temperature range, the ECU 176 shuts off or disables flow through the first injector 160 at block 214. For example, the ECU 176 may disable flow through the first injector 160 by closing the first valve 168. In some embodiments, a minimal amount of reductant may continue to flow through the first injector 160 to keep the injector 160 cool.

At elevated temperatures beyond the cold-start temperature range, ammonia may oxidize in the presence of the catalysts in the first treatment element 120. This may produce additional $NO_x$, rather than reducing the $NO_x$ content of the exhaust gas as intended. The exhaust gas treatment system 100 avoids this reaction by stopping injection through the first injector 160 at temperatures above the cold-start temperature range. $NO_x$ reduction responsibility is then borne by the second treatment element 124.

In addition, once the first treatment element 120 has sufficiently warmed, the $NO_x$ storage element 128 releases $NO_x$ that has been captured and stored. The SCR element 132 may reduce some of the $NO_x$ as it is released, while any remaining $NO_x$ is converted by the downstream SCR portion 138 of the second treatment element 124.

Figure 5:
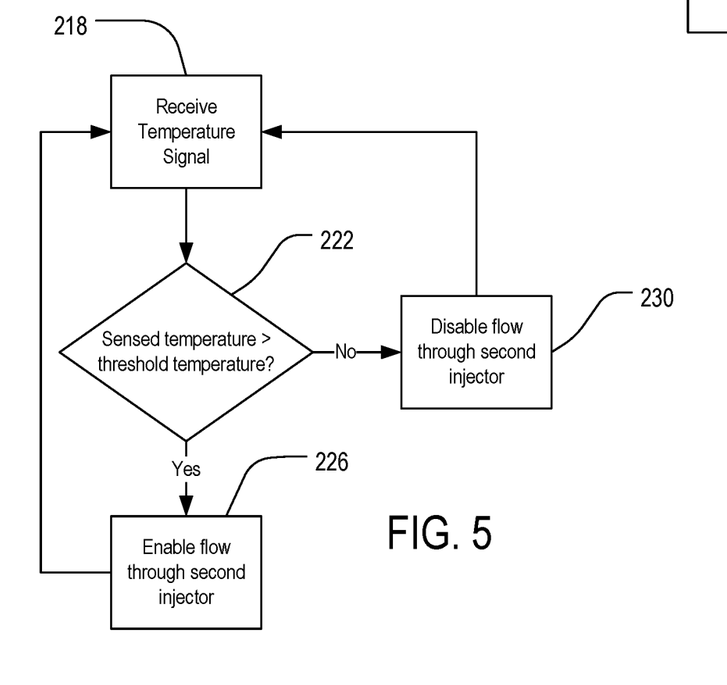
FIG. 5 is a flow diagram illustrating operation of the exhaust gas treatment system of FIG. 1.

Referring to FIG. 5, if the ECU 176 receives a temperature signal at block 218 and compares the sensed temperature with a threshold temperature at block 222. The received temperature signal may originate from the temperature sensor 192. Alternatively, the temperature signal may be provided by a second temperature sensor positioned, for example, adjacent the second treatment element 124. The threshold temperature may equal the upper end of the cold-start temperature range (e.g., 300 degrees Celsius or 250 degrees Celsius in some embodiments). Alternatively, other threshold temperatures may be selected.

If the sensed temperature is greater than the threshold temperature, indicating that the second treatment element 124 is sufficiently warmed up for effective $NO_x$ reduction, the ECU 176 sets the second injector 164 to dose the second reductant (i.e. DEF) into the exhaust gas pathway 104 (block 226; FIG. 5). For example, the ECU 176 may open the second valve 172 (FIG. 2). The DEF decomposes into ammonia, which reduces $NO_x$ in the SCR portion 136, and any unreacted ammonia is subsequently oxidized in the AOC portion 140. The treated exhaust then exits the exhaust gas treatment system 100 through the outlet 112.

If the sensed temperature falls below the threshold temperature, the ECU 176 disables flow through the second injector 164 by closing the second valve 172 (block 230; FIG. 5). This avoids the formation of urea deposits, which may occur at low temperatures. In some embodiments, a minimal amount of reductant may continue to flow through the second injector 164 to keep the injector 164 cool. In some embodiments, the ECU 176 may modulate flow of reductant through the second injector 164 to account for different levels of $NO_x$ in the exhaust gas (e.g., in response to feedback from a $NO_x$ concentration sensor; not shown).

Because the first treatment element 120 contains precious metal catalyst material, it also can perform the functions of a diesel oxidation catalyst (DOC). The ECU 176 may periodically initiate active regeneration cycles by dosing the exhaust gas with hydrocarbons (e.g., unburnt fuel) either in the cylinders of the engine 14 or between the engine 14 and the first treatment element 120. The hydrocarbons in the exhaust gas that pass through the first treatment element 120 react with the precious metal catalyst material and oxidize in an exothermic reaction. This can raise the temperature of the exhaust gas to temperatures of at least 600 degrees Celsius to oxidize soot on the downstream DPF 144.

The first treatment element 120 further promotes passive regeneration of the downstream DPF 144 at ordinary operating temperatures. In particular, the precious metal catalyst material in the first treatment element 120 promotes oxidation of NO to $NO_2$, thereby increasing a proportion of $NO_2$ in the exhaust gas. As evident from Equations (2) and (3), the higher proportion of $NO_2$ contributes to soot oxidation on the DPF 144.

In some embodiments, the ECU 176 may also periodically initiate desulfuring ($deSO_x$) regeneration cycles by dosing the exhaust gas with hydrocarbons and initiating reductant injection through the first injector 160. In the presence of ammonia, sulfur contamination that may build up on the SCR element 132 is oxidized at lower temperatures (e.g., between 400-500 degrees Celsius) than without ammonia present (requiring temperatures between about 600-650 degrees Celsius).

Thus, the close-coupled first treatment element 120 provides the exhaust gas treatment system 100 with improved cold-start $NO_x$ reduction, along with other benefits including improved active and passive regeneration and desulfuring performance. Because these capabilities are combined in a single treatment element, the overall size, weight, thermal mass, and cost of the exhaust gas treatment system 100 can be reduced.

Figure 6:
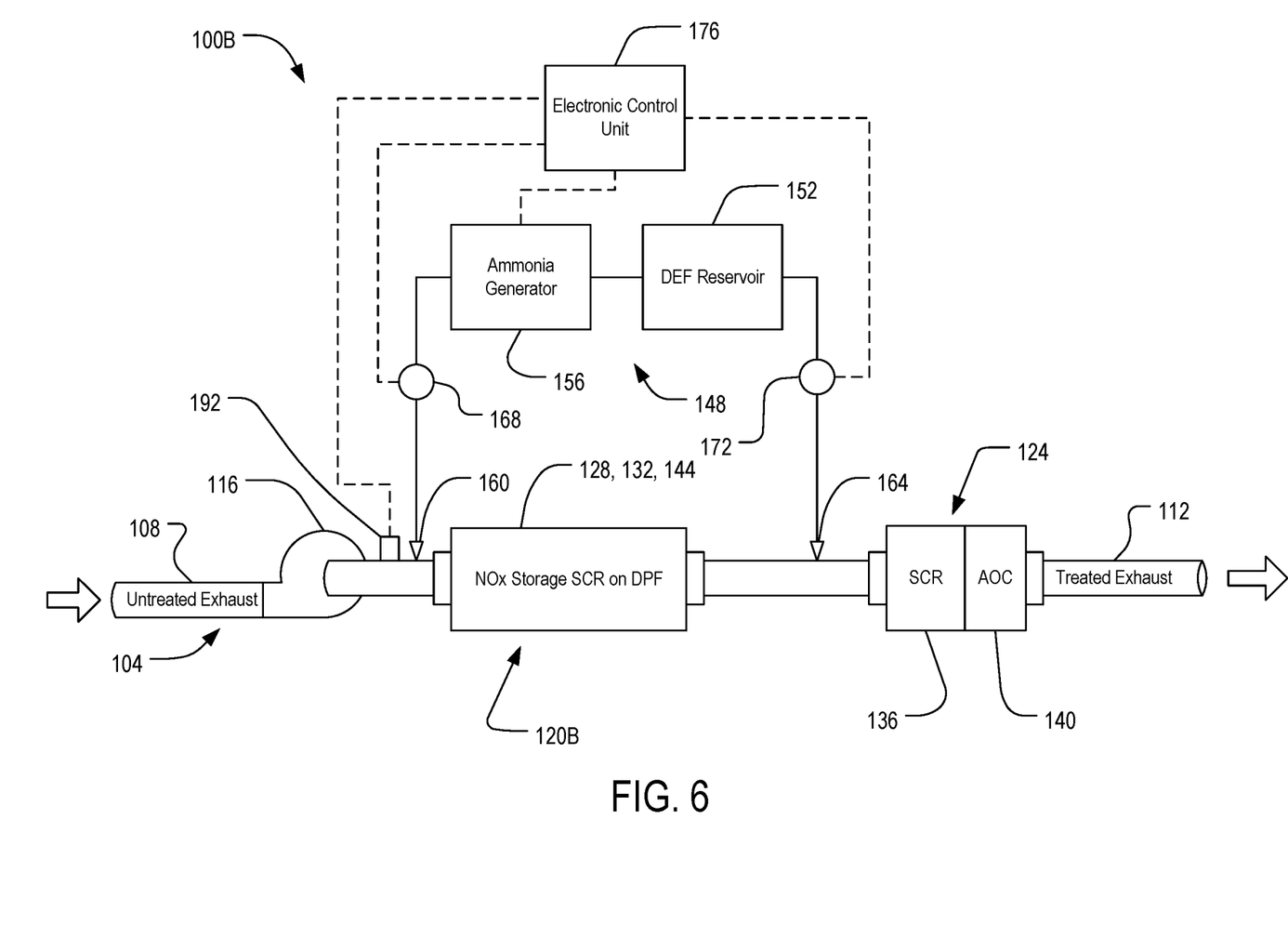
FIG. 6 is a schematic diagram of an exhaust gas treatment system according to another embodiment.

FIG. 6 illustrates an exhaust gas treatment system 100B according to another embodiment of the present disclosure. The exhaust gas treatment system 100B is similar to the exhaust gas treatment system 100 described above with reference to FIGS. 1-5. Features and elements of the exhaust gas treatment system 100B corresponding with features and elements of the exhaust gas treatment system 100 are given identical reference numbers. In addition, the following description focuses primarily on differences between the exhaust gas treatment system 100B and the exhaust gas treatment system 100.

The exhaust gas treatment system 100B includes a first treatment element 120B that integrates the $NO_x$ storage element 128, the SCR element 132, and the DPF 144. That is, the $NO_x$ storage element 128 and the SCR element 132 are coated on the filter substrate of the DPF 144. Accordingly, the overall length and volume of the exhaust gas treatment system 100B may be reduced.

Figure 7:
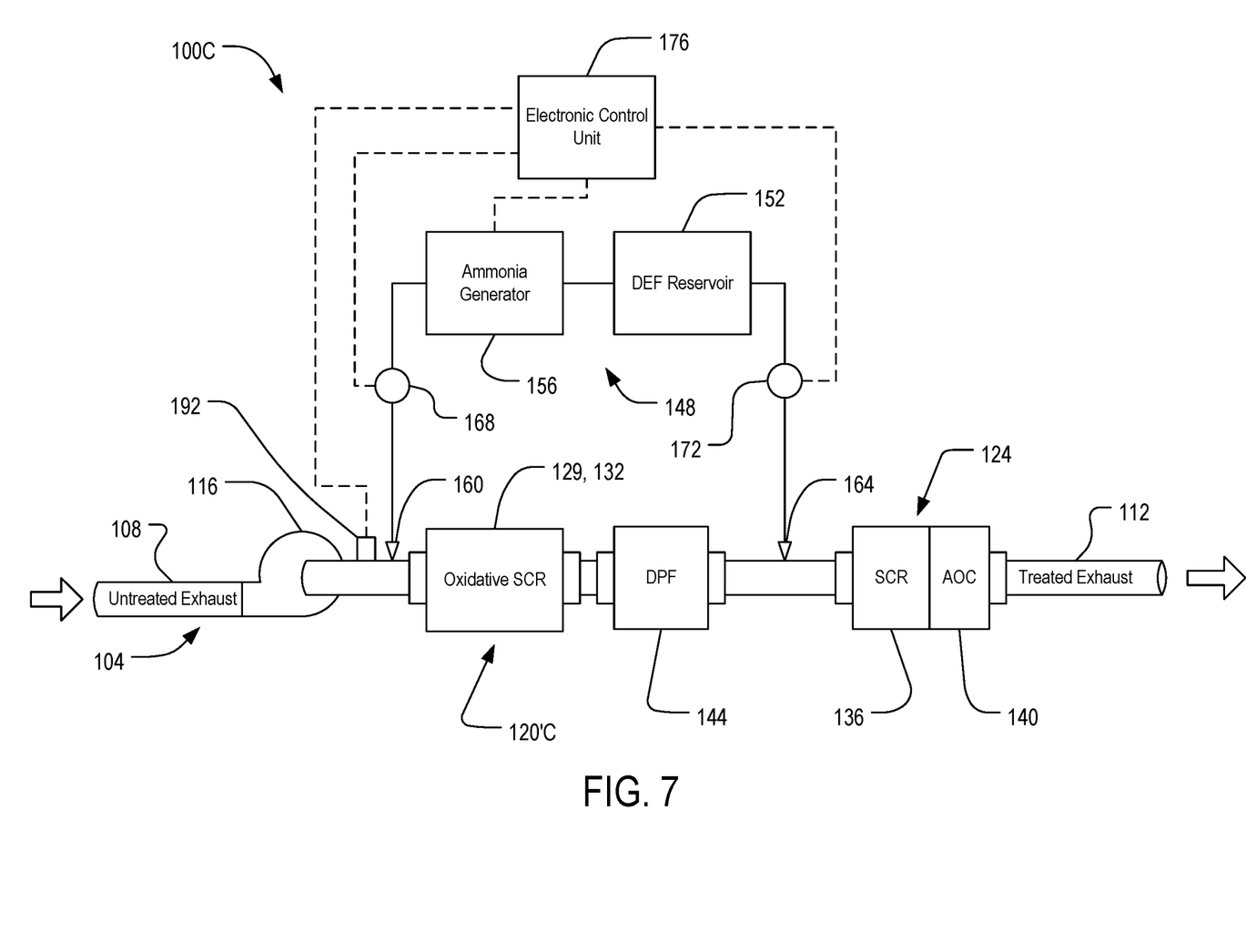
FIG. 7 is a schematic diagram of an exhaust gas treatment system according to another embodiment.

FIG. 7 illustrates an exhaust gas treatment system 100C according to another embodiment of the present disclosure. The exhaust gas treatment system 100C is similar to the exhaust gas treatment system 100 described above with reference to FIGS. 1-5. Features and elements of the exhaust gas treatment system 100C corresponding with features and elements of the exhaust gas treatment system 100 are given identical reference numbers. In addition, the following description focuses primarily on differences between the exhaust gas treatment system 100C and the exhaust gas treatment system 100.

The exhaust gas treatment system 100C includes a first treatment element 120C that replaces the $NO_x$ storage element 128 with an oxidation catalyst 129. The oxidation catalyst 129 is similar to the ammonia oxidation catalyst 140, with a layer of precious metal catalyst material (e.g., platinum, palladium, or both) coated on a flow-through substrate of metal or ceramic. The catalyst material is coated with a copper or iron zeolite layer. In the illustrated embodiment, the zeolite is Chazabite; however, other zeolites may be used. In other embodiments, the zeolite layer may be coated with the catalyst material. The oxidation catalyst 129 in the illustrated embodiment preferably has a precious metal density between 0.5 grams per cubic foot and about 5 grams per cubic foot.

The exhaust gas treatment system 100C operates similarly to the exhaust gas treatment system 100 of FIGS. 1-5. When the sensed temperature is within the cold start temperature range, the ECU 176 provides for flow of the first reductant (i.e. ammonia) through the first injector 160. The ammonia mixes with the exhaust gas and enters the first treatment element 120C. The oxidation catalyst 129 oxidizes carbon monoxide and hydrocarbons from the exhaust gas, while the SCR element 132 reduces $NO_x$ in the presence of ammonia. Because the first treatment element 120C is close coupled to the internal combustion engine 14, it heats up relatively quickly, which increases the efficacy of the SCR element 132.

At elevated temperatures beyond the cold-start temperature range, the ECU 176 may stop or reduce the rate of flow through the first injector 160. Once the second treatment element 124 is sufficiently warmed up for effective $NO_x$ reduction, the ECU 176 sets the second injector 164 to dose the second reductant (i.e. DEF) into the exhaust gas pathway 104 by opening the second valve 172. The DEF decomposes into ammonia, which reacts $NO_x$ in the SCR portion 136, and any unreacted ammonia is subsequently oxidized in the AOC portion 140. The treated exhaust then exits the exhaust gas treatment system 100 through the outlet 112.

Because the first treatment element 120C contains precious metal catalyst material, it also can perform the functions of a diesel oxidation catalyst (DOC) by exothermically oxidizing hydrocarbons to promote active regeneration and increasing $NO_2$ to promote passive regeneration of the DPF 144.

Figure 8:
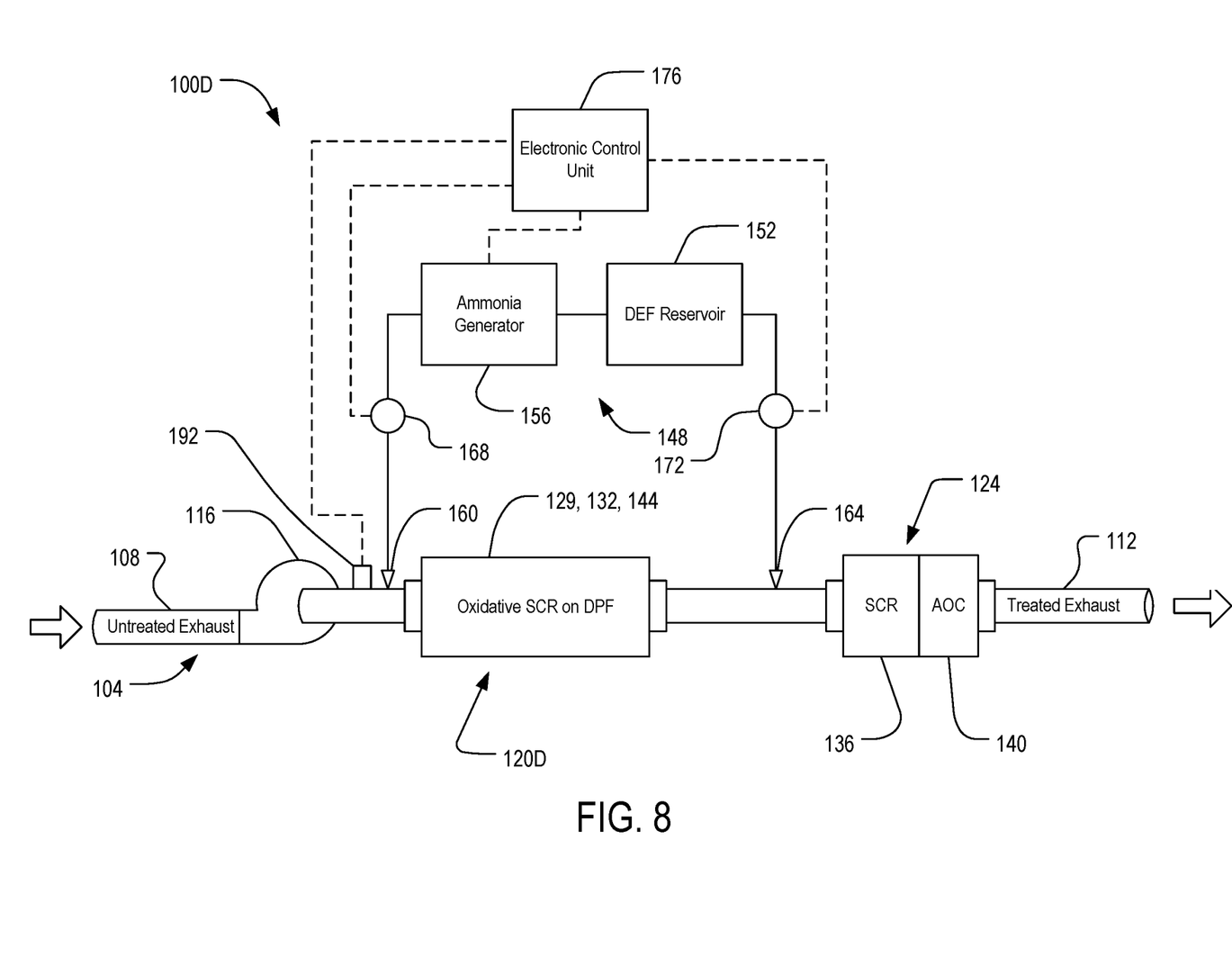
FIG. 8 is a schematic diagram of an exhaust gas treatment system according to another embodiment.

FIG. 8 illustrates an exhaust gas treatment system 100D according to another embodiment of the present disclosure.

The exhaust gas treatment system 100D is similar to the exhaust gas treatment system 100C described above with reference to FIG. 7. Features and elements of the exhaust gas treatment system 100D corresponding with features and elements of the exhaust gas treatment system 100C are given identical reference numbers. In addition, the following description focuses primarily on differences between the exhaust gas treatment system 100D and the exhaust gas treatment system 100C.

The exhaust gas treatment system 100D includes a first treatment element 120D that integrates the oxidation catalyst 129, the SCR element 132, and the DPF 144. That is, the oxidation catalyst 129 and the SCR element 132 are coated on the filter substrate of the DPF 144. Accordingly, the overall length and volume of the exhaust gas treatment system 100D may be reduced.

Various features of the disclosure are set forth in the following claims.

What is claimed is:

1. An exhaust gas treatment system for an internal combustion engine, the system comprising:
   an exhaust gas pathway configured to receive exhaust gas from the internal combustion engine;
   a first treatment element positioned within the exhaust gas pathway such that the first treatment element is close coupled to the engine, the first treatment element including a NOx storage element and a first selective catalytic reduction (SCR) element coated under or over the NOx storage element;
   a first injector configured to selectively introduce a first reductant into the exhaust gas pathway upstream of the first treatment element;
   a second injector configured to introduce a second reductant into the exhaust gas pathway downstream of the first treatment element; and
   a second treatment element positioned within the exhaust gas pathway downstream of the second injector, the second treatment element including a second SCR element.

2. The exhaust gas treatment system of claim 1, wherein the NOx storage element includes a passive NOx adsorber.

3. The exhaust gas treatment system of claim 1, wherein the NOx storage element includes a NOx storage catalyst.

4. The exhaust gas treatment system of claim 1, wherein the first injector is configured to introduce the first reductant into the exhaust gas in response to a sensed temperature of the exhaust gas being within a predetermined temperature range.

5. The exhaust gas treatment system of claim 4, wherein the predetermined temperature range is about 100 degrees Celsius to about 300 degrees Celsius.

6. The exhaust gas treatment system of claim 1, wherein the first reductant includes ammonia gas, and wherein the second reductant includes diesel exhaust fluid.

7. The exhaust gas treatment system of claim 1, wherein the first treatment element includes a diesel particulate filter (DPF), and wherein the NOx storage element is coated on the DPF.

8. The exhaust gas treatment system of claim 1, wherein the second injector is configured to introduce the second reductant into the exhaust gas in response to a temperature of the exhaust gas exceeding a predetermined temperature.

9. An exhaust gas treatment system for an internal combustion engine, the system comprising:
   an exhaust gas pathway configured to receive exhaust gas from the internal combustion engine;
   a first treatment element positioned within the exhaust gas pathway such that the first treatment element is close coupled to the engine, the first treatment element including a diesel particulate filter (DPF) coated with a precious metal catalyst;
   a first injector configured to selectively introduce a first reductant into the exhaust gas pathway upstream of the first treatment element;
   a second injector configured to introduce a second reductant into the exhaust gas pathway downstream of the first treatment element, wherein the second reductant has a different composition than the first reductant; and
   a second treatment element positioned within the exhaust gas pathway downstream of the second injector, the second treatment element including a selective catalytic reduction (SCR) element.

10. The exhaust gas treatment system of claim 9, wherein the first reductant includes ammonia gas, and the second reductant includes diesel exhaust fluid.

11. The exhaust gas treatment system of claim 9, wherein the first treatment element includes a selective catalytic reduction (SCR) element.

12. The exhaust gas treatment system of claim 11, wherein the first treatment element includes a NOx storage element.

13. The exhaust gas treatment system of claim 11, wherein the first second treatment element includes an ammonia oxidation catalyst (AOC).

14. An exhaust gas treatment system for an internal combustion engine, the system comprising:
   an exhaust gas pathway configured to receive exhaust gas from the internal combustion engine;
   a first treatment element positioned within the exhaust gas pathway such that the first treatment element is close coupled to the engine, the first treatment element including a selective catalytic reduction (SCR) element and a NOx storage element;
   a first injector configured to selectively introduce a first reductant into the exhaust gas pathway upstream of the first treatment element;
   a second injector configured to introduce a second reductant into the exhaust gas pathway downstream of the first treatment element; and
   a second treatment element positioned within the exhaust gas pathway downstream of the second injector.

15. The exhaust gas treatment system of claim 14, wherein the NOx storage element is configured to selectively adsorb NOx.

16. The exhaust gas treatment system of claim 15, wherein the first injector is configured to introduce the first reductant into the exhaust gas in response to a sensed temperature of the exhaust gas being within a predetermined temperature range.

17. The exhaust gas treatment system of claim 14, wherein the first treatment element includes a diesel particulate filter (DPF), and wherein the SCR element and the NOx storage element are coated on the DPF.

18. The exhaust gas treatment system of claim 14, wherein the second treatment element includes a selective catalytic reduction (SCR) element and an ammonia oxidation catalyst (AOC).

19. The exhaust gas treatment system of claim 14, wherein the first reductant includes ammonia gas, and wherein the second reductant includes diesel exhaust fluid.

* * * * *